US006688337B2

United States Patent
Ward

(10) Patent No.: US 6,688,337 B2
(45) Date of Patent: Feb. 10, 2004

(54) APPARATUS AND METHOD FOR THE ROBOTIC REPAIRING OF AN UNDERGROUND PIPE JUNCTION WITH A FLEXIBLE PATCH MECHANISM

(76) Inventor: Robert M. Ward, 161 Van Dorn, Glenwood Springs, CO (US) 81601

( * ) Notice: Subject to any disclaimer, the term of this patent is extended or adjusted under 35 U.S.C. 154(b) by 145 days.

(21) Appl. No.: 10/027,084

(22) Filed: Dec. 19, 2001

(65) Prior Publication Data

US 2003/0116211 A1 Jun. 26, 2003

(51) Int. Cl.[7] .............................................. F16L 55/16
(52) U.S. Cl. ........................ 138/98; 138/97; 405/150.1
(58) Field of Search .................. 138/97, 98; 405/150.1; 156/287; 264/267, 269

(56) References Cited

U.S. PATENT DOCUMENTS

| 87,900 | A | | 3/1869 | Ball |
|---|---|---|---|---|
| RE6,488 | E | | 6/1875 | Van Duzer |
| 1,933,710 | A | | 11/1933 | Cornell, Jr. .................. 29/157 |
| 1,941,465 | A | | 1/1934 | Cornell, Jr. ................. 285/108 |
| 3,183,023 | A | | 5/1965 | Morrison .................... 285/156 |
| 3,232,645 | A | | 2/1966 | Bucks ........................ 285/205 |
| 3,968,552 | A | * | 7/1976 | Hunter .................... 29/890.15 |
| 4,029,428 | A | | 6/1977 | Levens ....................... 408/127 |
| 4,135,958 | A | | 1/1979 | Wood ......................... 156/199 |
| 4,273,598 | A | * | 6/1981 | Bowditch .................... 156/94 |
| 4,724,108 | A | | 2/1988 | Jurgenlohmann ........... 264/35 |
| 4,758,454 | A | | 7/1988 | Wood ......................... 428/36 |
| 4,778,553 | A | | 10/1988 | Wood ........................ 156/287 |
| 4,883,557 | A | | 11/1989 | Morinaga et al. ........... 156/287 |
| 5,040,922 | A | | 8/1991 | Himmler .................... 405/155 |
| 5,108,288 | A | | 4/1992 | Perry ......................... 433/173 |
| 5,223,204 | A | | 6/1993 | Endoh ........................ 264/516 |
| 5,280,811 | A | | 1/1994 | Catallo et al. ............... 138/98 |
| 5,285,817 | A | | 2/1994 | Sigel .......................... 138/97 |
| 5,286,144 | A | | 2/1994 | Griner ....................... 408/224 |
| 5,297,582 | A | | 3/1994 | Kitajima et al. .............. 138/98 |
| 5,329,063 | A | | 7/1994 | Endoh ......................... 138/98 |
| 5,333,649 | A | | 8/1994 | Shimokawa et al. .......... 138/89 |
| 5,340,160 | A | * | 8/1994 | Meijers et al. ................ 285/15 |
| 5,393,481 | A | | 2/1995 | Wood ......................... 264/516 |
| 5,423,352 | A | | 6/1995 | Sigel ........................... 138/98 |
| D363,115 | S | | 10/1995 | Lennartsson ............... D23/263 |
| 5,454,401 | A | * | 10/1995 | Kamiyama et al. ........... 138/98 |
| 5,598,873 | A | | 2/1997 | Kamiyama et al. ........... 138/98 |
| 5,692,543 | A | | 12/1997 | Wood .......................... 138/98 |
| 5,752,786 | A | * | 5/1998 | Huikari .................... 405/184.2 |
| 5,915,419 | A | | 6/1999 | Tweedie et al. .............. 138/98 |
| 5,927,341 | A | * | 7/1999 | Taylor ......................... 138/98 |
| 5,971,032 | A | | 10/1999 | Ward ........................... 138/98 |
| 6,082,411 | A | | 7/2000 | Ward ........................... 138/98 |
| 6,152,184 | A | * | 11/2000 | Kamiyama et al. ........... 138/98 |
| 6,206,049 | B1 | | 3/2001 | Ward ........................... 138/98 |
| 6,337,114 | B1 | * | 1/2002 | Wood et al. ................ 428/36.9 |
| 2003/0106601 | A1 | * | 6/2003 | Kweon ......................... 138/98 |

FOREIGN PATENT DOCUMENTS

DE 550860 7/1993

* cited by examiner

Primary Examiner—James Hook
(74) Attorney, Agent, or Firm—Sheridan Ross P.C.

(57) ABSTRACT

An apparatus and method for sealing an underground junction between a lateral service line and a main pipeline from the inside-out. One embodiment provides a substantially rigid patching apparatus which may be positioned and installed with a robotic device within a main pipeline. The patching apparatus has a flange shaped to fit the internal diameter of the main pipeline and a tubular stem or sleeve which penetrates into the lateral service line. The patching apparatus contains an interconnection substrate such as felt, sponge or other similar material. The interconnection substrate may be impregnated with a bonding agent which sealingly interconnects the patching apparatus to the main pipeline and lateral service line, and may be heated by utilizing a heating element within a support cage, thus reducing the time required for curing.

31 Claims, 11 Drawing Sheets

APPARATUS AND METHOD FOR THE ROBOTIC REPAIRING OF AN UNDERGROUND PIPE JUNCTION WITH A FLEXIBLE PATCH MECHANISM

FIELD OF THE INVENTION

This invention relates to an apparatus and method for remotely repairing existing underground pipe junctions from the inside-out, as opposed to digging a trench and replacing or repairing the pipe from the outside-in. More specifically the present invention relates to a flexible patch used in the repair of an underground pipe junction.

BACKGROUND OF THE INVENTION

Sewer lines, water lines and other types of buried pipelines can develop leaks over time. These leaks are a result of decaying materials such as the clay used in the construction of the pipeline, obstructions which may clog a line, chemical exposure or crushing due to overburden pressure due to the inferior materials used in very old pipelines. Many older lines require repair to prevent exterior leaking and possible ground water contamination. Additionally, without proper repair ground water can infiltrate into the broken sewer lines, thus causing significant increase in the volume of throughput and the expense of chemicals and other materials used for treatment of the sewer water.

Repairing leaking sewer lines and other forms of fluid transmission lines is very expensive due to the previous necessity of digging a trench from the surface to physically remove the pipe. The removal and replacement of this pipe from the surface is time-consuming, expensive and not practical in many old commercial and residential neighborhoods due to narrow alleyways, heavy traffic and the volume of pipe located below existing buildings or other obstructions.

Thus, "trenchless technology" was developed which utilizes machinery and methods of repairing sewer pipe and other buried transmission lines from the inside-out. This process eliminates the need for digging expensive trenches aboveground. In brief, the existing main pipeline is repaired by installing a plastic liner which is inserted into the existing pipeline. The plastic liner is then bonded to the internal surface of the existing pipeline by heating or other methods. The existing lateral service lines which feed the main pipeline are then located by the use of a robotic device with an optical camera. Once identified, a hole is drilled by the robot mechanism into the existing pipeline, thus providing access into the lateral service line.

Unfortunately, the hole drilled into the existing lateral service line does not provide a satisfactory seal, thus permitting significant volumes of groundwater, as well as plant roots, dirt and other foreign objects to infiltrate the main pipeline at the junction point between the lateral service line(s) and the main pipeline. Additionally, contaminants within the main pipeline can potentially leak and pollute the adjacent groundwater. As a further complication, some of the lateral service lines are not joined with the main pipeline at a substantially ninety-degree angle but are joined to the pipeline at acute or obtuse angles.

Thus, a need exists to provide a reliable patching mechanism to seal the junction point between the lateral service line and main pipeline which can be operated remotely and which functions from within the small internal confines of the main pipeline.

Others have attempted to seal the junction between the main pipeline and lateral service line, but known approaches have considerable disadvantages. U.S. Pat. No. 5,329,063 to Endoh exemplifies a technique where a flexible tubular liner is inserted into a lateral line so that the entire lateral line receives a lining. Air or liquid pressure is needed to insert the reversed flexible liner into the lateral. Once the liner is extended by the air pressure from the junction to the other end of the lateral pipe, access to that other end of the lateral line is required to cut away any excess liner. In this way, the entire lateral pipe is lined from one end to the other.

As those skilled in the art can appreciate, installing a flexible liner in a lateral service line is very time consuming and difficult. The apparatus required for installation has many moving parts and is complex to operate. Additionally, access to the distal end of the lateral line (i.e., the end away from the main pipeline) is needed to cut away the excess liner. The complex setup required makes sealing the junction of the main pipeline and lateral service line both time consuming and expensive.

Further, the results achieved by the flexible liners are erratic because the lateral service line is not a controlled environment. For example, the lateral may contain debris which will obstruct the flexible liner so that when the liner is hardened, the obstructions will permanently interfere with the flow in the lateral line. Additionally, the environment in into which the flexible liner must be installed is subject to wide temperature swings which further encumbers achieving consistent results. Therefore, there is a need for quickly and inexpensively sealing the junction between a main pipeline and lateral service line with consistent results. This is especially needed in situations where it is difficult or impractical to obtain access to the distal end of a lateral service line. Further, there is a need for quickly curing the epoxy, glue or resins which are used as a sealing medium between the underground patch and the lateral pipeline and main pipeline.

Lateral service lines are also brought into and out of service at different junctures dependent upon the needs of the community. Thus, a need exists for a removable yet effective seal to seal off a lateral service line to remove the line from service.

Additional attempts have additionally been attempted using rigid patch assemblies such as described in U.S. Pat. Nos. 6,082,411 and 6,206,049 to Ward, which are incorporated herein by reference in their entirety. The patching mechanism described in these patents although generally effective, has been found to have limitations since the patch mechanism is not capable of bending to such a degree to allow a proper seal between lateral lines and main lines which are not interconnected at substantially right angles.

Thus, there is a need for an apparatus and method for installing a flexible patching mechanism between a lateral and main pipeline which is sufficiently adaptable to permit defraction and movement as necessary.

SUMMARY OF THE INVENTION

It is thus one object of the present invention to provide an apparatus and method for sealing the junction point between a lateral service line and a main pipeline from the inside-out, i.e., using trenchless technology. Thus, in one aspect of the present invention a patching apparatus is provided which may be positioned and installed with a robotic device within a main pipeline. The patching apparatus in one embodiment is comprised of a polyvinyl chloride (PVC) material, or the like, having a flange which is shaped to fit the internal diameter of the main pipeline and an extending stem which penetrates into the lateral service line.

In another aspect of the present invention, the patching apparatus flange contains an interconnection substrate such as felt, sponge or another similar material to provide a resilient, compressible material suitable for sealing the pipe junction. The interconnection substrate may be impregnated with a bonding agent such as a water activated epoxy or grout which sealingly interconnects the patch to the main pipeline and lateral service line. Alternatively, an adhesive, glue, or other type of material may be applied to the interconnector substrate just prior to installation. To further provide sealing in another embodiment, an annular gasket may be positioned around the stem portion to promote sealing engagement between the stem and the internal surface of the lateral service line. The seal provided by the inverted-tee patch effectively eliminates most water intrusion or the influx of plant roots and other matter at the junction point which can seriously damage or obstruct the main pipeline.

It is yet another object of the invention to provide a remotely controlled robotic arm capable of applying the inverted-tee patch to the junction between the main pipeline and lateral service line from within the main pipeline. The robotic arm includes a support cage which holds the inverted-tee patch in place during insertion. The robotic arm laterally extends to apply the patch to the junction. Thus, in yet another aspect of the present invention a robotic arm is interconnected to a substantially elongated robot capable of traveling within a main sewer or other transmission line. The elongated robot is generally positioned by means of a remotely controlled assembly with an optical camera mechanism which properly identifies the junction point of the main pipeline and lateral service line.

It is yet another object of the present invention to provide a flexible patch which does not require curing or the application of pressure to install the patch at the junction between the lateral service line and the main pipeline. Thus, the possibility of error is reduced since the patch is deforms itself to the form of the juncture of the service line and the pipeline and as such is not susceptible to failure as a result of non-controllable environmental factors such as debris in the pipeline, cold temperatures, etc. Furthermore, this type of patch does not require an entire service line to be lined, but only the junction point. Thus, significant time and expense can be saved while achieving a greater degree of reliability.

It is another aspect of the present invention to provide a heating apparatus which can be positioned below the patch mechanism, to accelerate the curing of the glue/epoxy bonding agent which is positioned between the patch and main pipeline. In one embodiment the heating element may be an integral part of the support cage, or alternatively be a separate component which is positioned below, or adjacent the existing support cage. To activate the heating element, a remote control power source may be used to selectively provide electrical heat energy to the heating mechanism for a predetermined period of time. Alternatively, a battery operated mechanism may be used which has a timer which automatically activates and provides heat energy to the patch after a predetermined time period or upon activation of the scissor multiplier to place the patch in its final position of use. Alternatively, different types of energy sources can be used to quickly cure the glue, epoxy or other type of adhesive, including ultra-violet light energy, radiation, or other energy sources commonly known in the art.

It is yet another aspect of the present invention to provide a patching mechanism which allows sufficient deflection between a flange portion and a stem portion to provide improved sealing characteristics at a junction between a lateral line and a main line which is not oriented at a substantially 90° or right angle. Thus, in one embodiment of the present invention, a "flex-joint" is provided between the flange and the stem, and which allows a deflection angle of at least about five degrees, or a deflector at the lower portion of the stem of at least about 3 inches.

In an alternative embodiment of the present invention the flange is additionally comprised of a flexible material such as PVC pipe or rubber and which further is adapted for conforming to junctions between two pieces of pipe which are not at substantially 90° or right angles.

In yet another aspect of the present invention, a seal which can be fit into the stem of the patch or can fit over the stem of the patch is provided. The seal is hydrophilic to prevent any residual water, sludge or other resident of the lateral service line from entering the main pipeline.

Thus, in one aspect of the invention, the following method is provided for installing a pipeline patch:

A method for remotely installing a patch to an underground junction between a main pipeline and a lateral service line, wherein said lateral service line is joined to the main pipeline at an angle other than a ninety-degree angle, comprising the steps of:
(a) providing a patch comprising:
a tubular stem having a substantially rigid portion, a flexible portion, a first end and a second end, the second end having a substantially open aperture for communication with the lateral service line;
a convex flange having an exterior service, an interior surface and a cutout portion operatively sized and interconnected to the first end of said tubular stem, wherein said tubular stem extends away from the exterior surface of said convex flange;
said flexible portion having deformation properties adapted to allow the rigid portion of the tubular stem to be fit into said lateral service line at the angle at which the lateral service line is joined to the main pipeline; and,
sealing means interconnected to the exterior surface of said convex flange having resilient deformation properties adapted to provide sealing engagement between said convex flange and an interior surface of the main pipeline;
(b) determining a location of the junction between the main pipeline and the lateral service line;
(c) removably attaching said patch to a support cage;
(d) positioning said support cage adjacent to the location of the underground junction;
(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;
(f) curing said patch so that said patch becomes fixedly connected to the internal surface of the main pipeline wherein said patch substantially prevents infiltration of foreign matter into the main pipeline at the underground junction;
(g) deactivating the lateral extender to move said support cage from the second engagement position to the first traveling position; and
(h) removing said lateral extender and said support cage from the main pipeline.

In another embodiment of the present invention, the following method is provided for installing a pipeline patch:

A method for remotely installing a patch to an underground junction between a main pipeline and a lateral service line, wherein said lateral service line is joined to the main pipeline at an angle other than a ninety-degree angle, comprising the steps of:

(a) providing a patch comprising:

a tubular stem having a substantially rigid portion, a flexible portion, a first end and a second end, the second end having a substantially open aperture for communication with the lateral service line;

a convex flange having an exterior service, an interior surface and a cutout portion operatively sized and interconnected to the first end of said tubular stem, wherein said tubular stem extends away from the exterior surface of said convex flange;

said flexible portion having deformation properties adapted to allow the rigid portion of the tubular stem to be fit into said lateral service line at the angle at which the lateral service line is joined to the main pipeline;

a seal, said seal adapted to fit within the aperture of the tubular stem to seal off the lateral service line; and, sealing means interconnected to the exterior surface of said convex flange having resilient deformation properties adapted to provide sealing engagement between said convex flange and an interior surface of the main pipeline;

(b) determining a location of the junction between the main pipeline and the lateral service line;

(c) removably attaching said patch to a support cage;

(d) positioning said support cage adjacent to the location of the underground junction;

(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;

(f) curing said patch so that said patch becomes fixedly connected to the internal surface of the main pipeline wherein said patch substantially prevents infiltration of foreign matter into the main pipeline at the underground junction;

(g) deactivating the lateral extender to move said support cage from the second engagement position to the first traveling position; and (h) removing said lateral extender and said support cage from the main pipeline.

These and other objects, features, and advantages of the invention will become apparent from the following best mode description, the drawings and the claims.

BRIEF DESCRIPTION OF THE DRAWINGS

The figures which follow depict a preferred embodiment of the invention, and may depict various alternative embodiments. The invention is not limited to the embodiment or embodiments depicted herein since even further various alternative embodiments will be readily apparent to those skilled in the art. For the ease of the reader, like reference numerals in various drawing figures refer to identical structural elements or components.

DETAILED DESCRIPTION OF THE PREFERRED EMBODIMENT

At the outset, it should be understood that this invention comprises a trenchless technology for the repair and reinforcement of pipes. More particularly, the present invention provides a method and an apparatus for installation of a patch to a junction between a lateral service line and a main pipeline. The description which follows described a preferred embodiment of the invention, and various alternative embodiments. It should be readily apparent to those skilled in the art, however, that various other alternative embodiments may be accomplished without departing from the spirit or scope of the invention.

Figure 1:
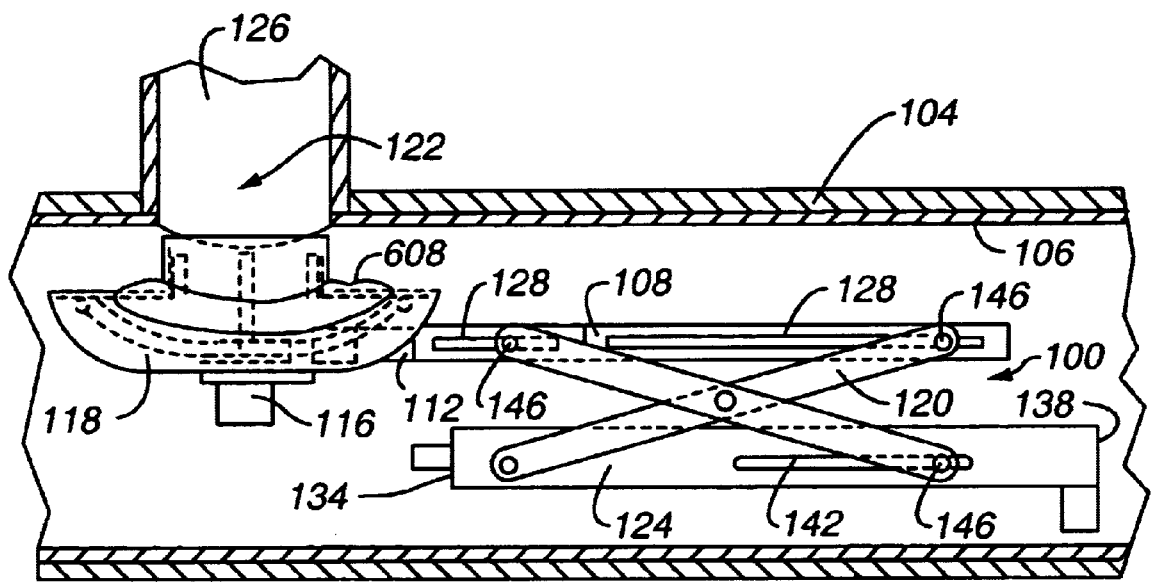
FIG. 1. is a side view of an robotic arm holding an inverted-tee patch immediately prior to insertion into a lateral.
Figure 2:
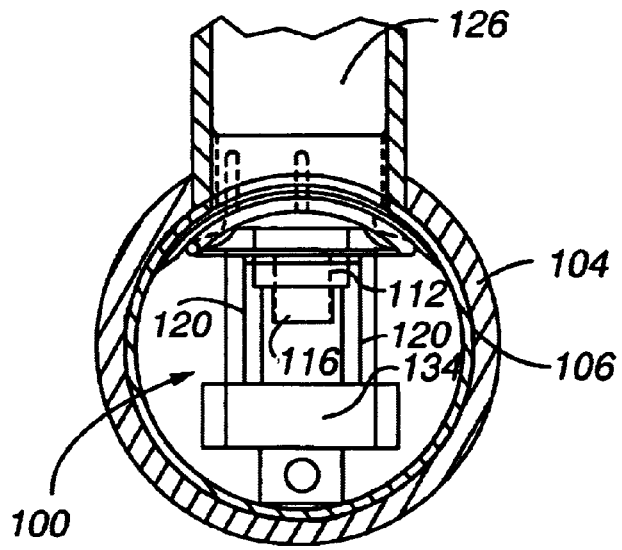
FIG. 2 is an end view of inverted-tee patch being installed into a lateral.

Referring to FIGS. 1 and 2, a side and end view of the robot mechanism 100 within a main pipeline 104 are respectively shown. The robot mechanism 100 includes an upper platform 108, an extension arm 112, a support cage 116, scissor multipliers 120, a lower platform 124, and a slide (not shown). The robot mechanism 100 attaches to a power assembly (not shown) which remotely activates the scissor multipliers 120 and rotates the robot mechanism 100.

The upper platform 108 at a forward end 130 is fixedly attached to the extension arm 112 which engages the support cage 116. The support cage 116 is adapted to removably hold a patch 118 in place for insertion into a lateral service pipe 126. The patch 118 in profile is shaped like an inverted-tee (see FIG. 3). Any overextension of the lateral service pipe 126 beyond an inner surface of the main pipeline 104 is typically ground away prior to insertion of the patch 118 so that the patch will mount flush within an inner surface of the pipeline 104, as further described below. Each side of the robot mechanism 100 has a scissor multiplier 120 which allows lateral extension. Two slots 128 on each end of the upper platform 108 engage each scissor multiplier 120.

The lower platform 124 and attached slide is typically positioned near the bottom of the pipeline and provides support for the scissor multiplier 120 and upper platform 108. A front end 134 of the lower platform 124 is attached to the slide which supports the front end while allowing it to easily move back and forth within the pipeline 104. A rear end 138 of the lower platform 124 attaches to the power assembly which has a scissor motor (not shown) and a rotation motor (not shown). The scissor motor activates the scissor multiplier 120 to change the elevation of the upper platform 108 with respect to the lower platform 124. The rotation motor rotates the robot mechanism 100 with respect to the power assembly. By rotating the robot mechanism 100, lateral lines not vertically aligned with the flow in the main pipeline 104 become aligned with the support cage 116.

The scissor multiplier 120 contracts and expands to respectively raise and lower the upper platform 108 with respect to the lower platform 124 under the control of the scissor motor. It is once again noted, there are two scissor multipliers 120 on opposite sides of the platforms 108, 124 (see FIG. 2). Slots 128 on the upper platform 108 and a slot 142 on the lower platform 124 engage the scissor multiplier 120. When the scissor multiplier 120 contracts and expands, pins 146 slide move within the slots 128, 142. As shown in FIG. 2, the patch is inserted into the lateral line 126 when the scissor multiplier 120 contracts from the partially expanded position depicted in FIG. 1.

The interconnection substrate 608 (See FIG. 1) affixes the patch 118 to the pipe junction 122. To absorb epoxy or grout, the interconnection substrate 608 made of sponge, felt or the like, and is attached to a bonding surface 612 of the flange 604. Having the interconnection substrate 608 be absorbent allows easy transport of the epoxy which might otherwise drip off the flange 604. Additionally, the interconnection substrate 608 provides an additional barrier to prevent leakage at the junction 122. As can be appreciated by one skilled in the art, the junction 122 may have imperfections which would prevent epoxy alone from effectively sealing, but the deformable interconnection substrate 608 conforms to any imperfections to provide a better seal. The interconnection substrate is preferably able to compress to about one-third or less of its original thickness during installation. Preferably, the interconnection substrate 608 is a sponge material of a thickness greater than 5 mm which is impregnated with a liquid epoxy. In other embodiments, the impregnated interconnection substrate 608 can be anything which bonds the patch 188 to the junction 122 and substantially prevents foreign matter, including water, from seeping into the pipes 104, 126. In another embodiment, the interconnection substrate 608 is used in conjunction with an annular gasket on the stem 600 to provide improved sealing between the stem and the lateral service line 126 to help prevent seepage into the main pipeline 104.

Figure 3:
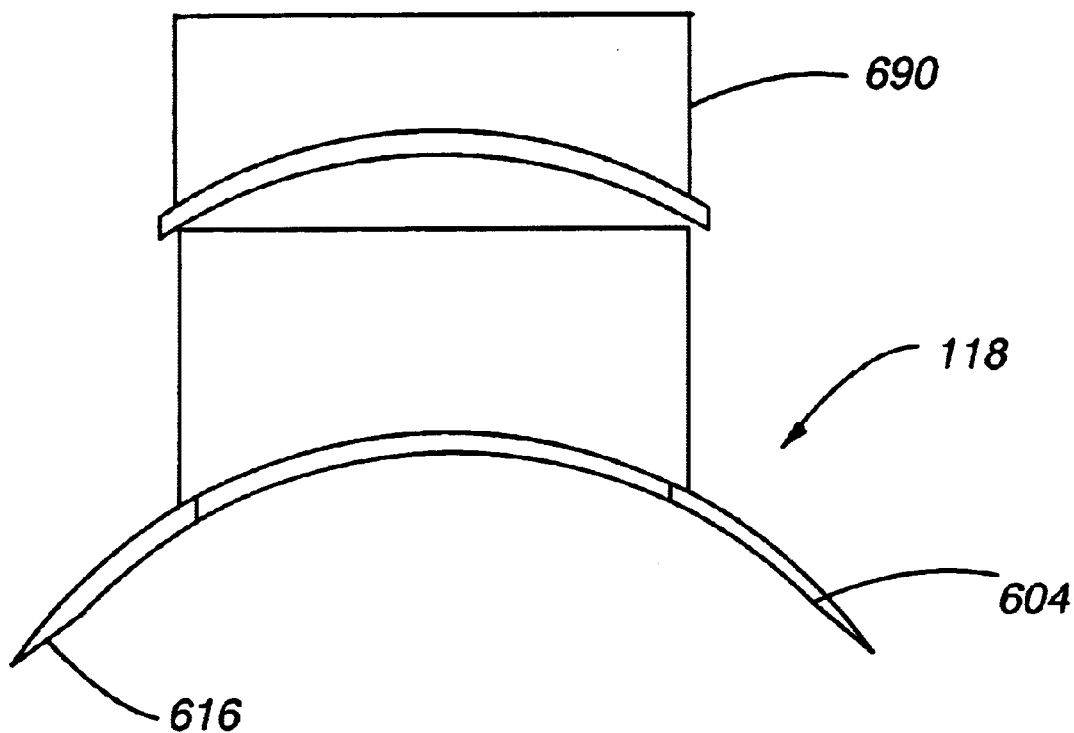
FIG. 3 is an end view of an inverted-tee patch and further shows a sleeve in position to be slid over the stem of the inverted-tee patch to increase the external diameter.

In an alternative embodiment of the present invention shown in FIG. 3, a sleeve or bushing 690 may be provided to selectively increase the diameter of the stem 600 and provide an improved seal with the lateral service line 126. More specifically, due to various intolerances of clay pipe and other pipe materials the exact internal diameter of the lateral service line 126 may vary. Therefore, to improve the seal between the lateral service line 126 internal diameter and the external diameter of the stem, a sleeve or bushing 690 may be positioned over the stem to increase its diameter. The bushing 690 may be made of a durable plastic or fiberglass, or alternatively plastic, felt, rubber or other similar materials commonly known in the plumbing and pipeline industries. Although the bushing 690 may have a length less than the total length of the stem, it is feasible that the bushing 690 have a length shorter than the total length of the stem and still be effective.

The following discusses a method of using the aforementioned robot mechanism 100, support cage 116 and patch 118 to perform a patching operation. The first step requires identifying the lateral service line 126 requiring a patch 118 after the installation of a liner in the main pipeline 104. Identification may be done visually by an operator or remotely using a video camera or other sensing device. Once the lateral service line 126 is identified, access is provided to the lateral service line 126 by drilling a hole through the liner with the use of a remotely controlled drill attached to a robotic apparatus which is pulled through the main pipeline 104. If the lateral line 126 overextends into the main pipeline 104, the excess can be trimmed with a robotic grinder or the like.

The patch 118 is typically prepared for attachment and placed on the support cage 116 before inserting the robot mechanism 100 into the main pipeline 104. This preparation may require attaching the interconnection substrate 608 to the bonding surface 612, at an earlier time, and applying the epoxy or grout to the interconnection substrate immediately prior to use. Alternatively, the substrate 608 may be pre-attached to the exterior surface of the flange and in a preferred embodiment, may be pre-impregnated with a glue or epoxy. The epoxy or grout typically has a viscus consistency for a period of time before hardening upon exposure to a catalyst. The catalyst for the hardening process may be air, heat, water, or any other suitable technique known in the art. Placing the patch 118 on the support cage 116 is typically performed before the robot mechanism 100 is inserted into the pipeline 104 because after insertion there may not be sufficient clearance between the pipeline wall and support cage 116.

In the next step, the support cage 116 holding the inverted-tee patch 118 is positioned so that when the support cage 116 is laterally extended, the patch 118 will mate with the lateral service line 126. This may require dragging the robot mechanism 100 and attached power assembly so that the patch 118 is longitudinally aligned in the main pipeline 104 with the lateral service line 126. Often, the lateral service line 126 is not aligned vertically with respect to the flow in the main pipeline 104. Under these circumstances, the power assembly activates its rotation motor to angularly align the patch 118 with the junction 122.

Once the patch 118 is properly positioned, the power assembly activates the scissor motor to contract the scissor multiplier 120. The contraction of the scissor pushes the support cage 116 and patch 118 toward the lateral line 126. In this way, the tubular stem 600 is inserted inside the lateral line 126 and the convex flange 604 is aligned with the inside of the main pipeline 104. The patch 118 is held in place with sufficient force until the epoxy or grout cures. Pressure is provided to the support cage 116 so that the interconnection material 608 is compressed to sufficiently fill-in any imperfections in the junction with interconnection substrate 608. In one embodiment, curing takes approximately 25 minutes. After curing, the epoxy or grout applied to the interconnection substrate 608 optimally produces a water-tight seal between the lateral service line 126 and main pipeline 104 and holds the patch 118 rigidly in place.

After the scissor multiplier 120 is expanded to move the support cage 116 away from the patch 118 affixed to the junction 122, the robot mechanism 100 and power assembly are free to be removed from the pipeline 104. In this way, a patch 118 may be used to seal the pipe junction 122.

Figure 4:
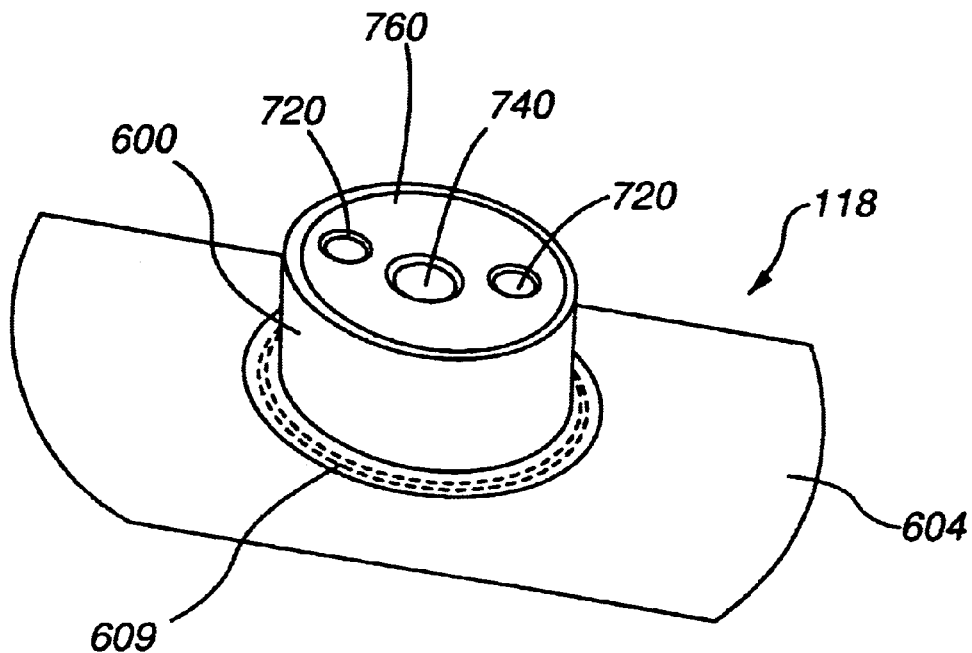
FIG. 4 is a perspective end view showing a support cage with integral heating element and the associated wiring connected thereto.
Figure 5:
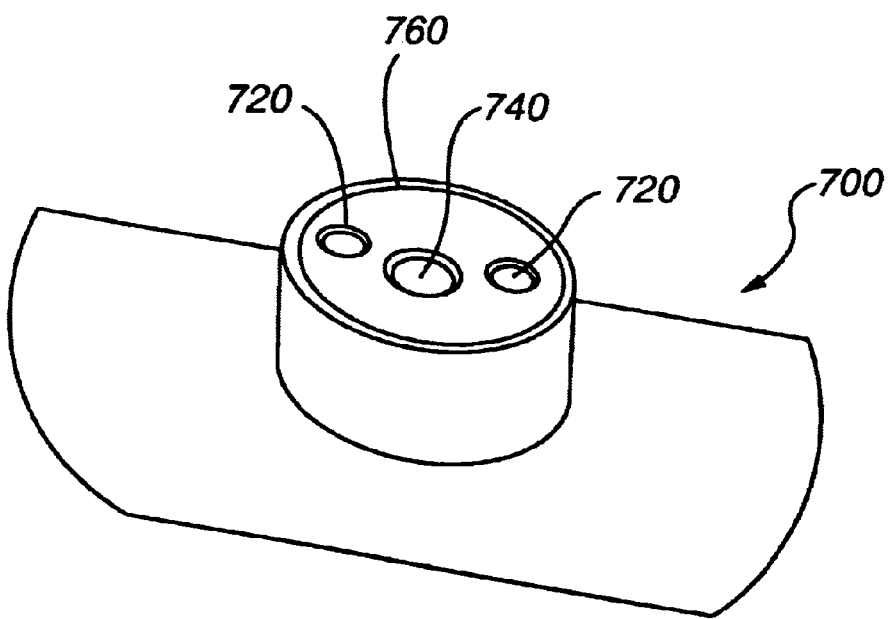
FIG. 5 is a perspective end view showing the heating element, having a convex outer surface which matingly engages the inverted-tee patch.

Referring now to FIGS. 4 and 5, in another aspect of the present invention a support cage 116 with integral hearing element 700 is provided which accelerates the curing of the epoxy/glue bonding and sealing agent which is positioned between the main pipeline 104 and the patch 118. The support cage integral heating apparatus 700 s preferably constructed of a rigid heat conducting material such as aluminum, stainless steel, although other metallic materials commonly known in the art may be used for the same purpose. In one embodiment of the present invention heat energy is provided to the heating apparatus 700 by a plurality of heat conducting wires being run throughout the interior of the support cage, which is in turn provided heat energy from a typical electrical outlet, or generator in remote locations. Alternatively, the wires, or heat trace materials commonly used to prevent the freezing of pipe could be positioned below or adjacent the support cage to provide the same heat energy.

Figure 11:
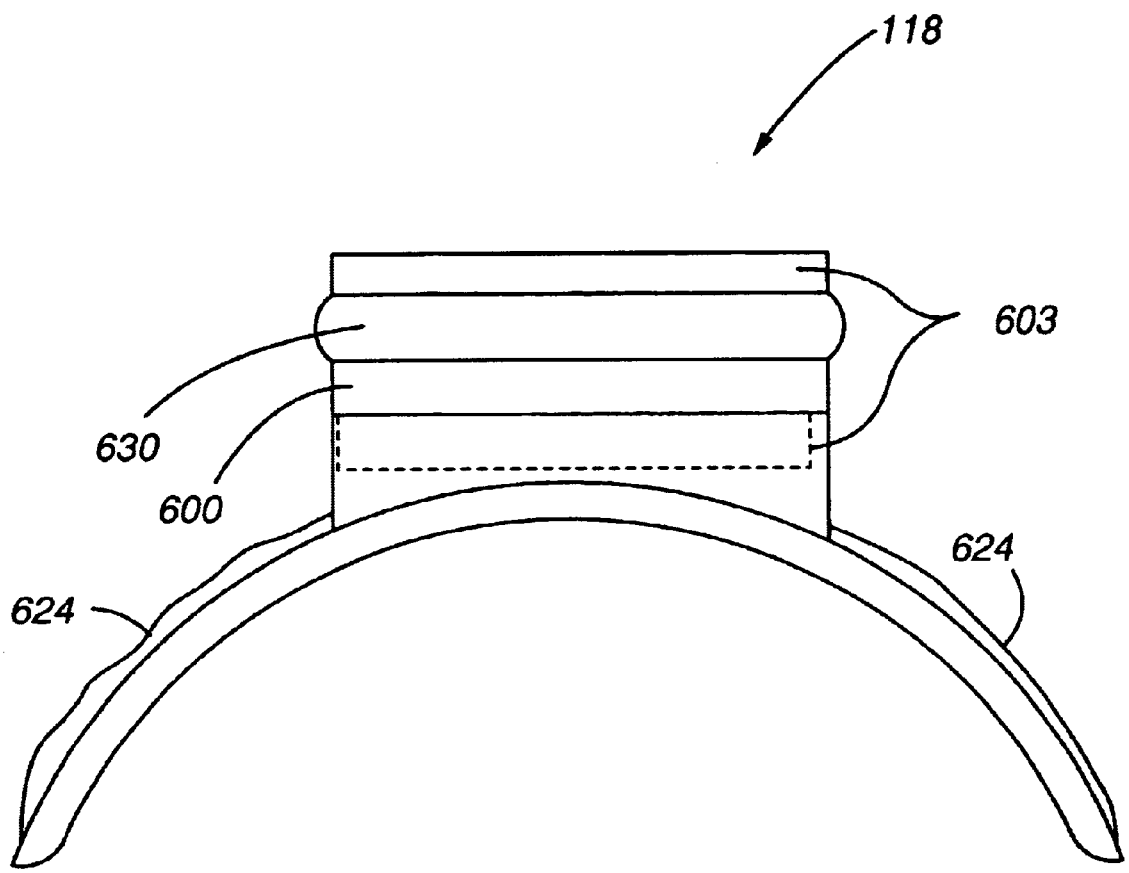
FIG. 11 is a patch having an activated seal and showing the use of epoxy to adhere the patch to a juncture.

In a preferred embodiment of the present invention shown in FIG. 11, the heating apparatus 700 is one integral piece of aluminum which has a convex outer surface which matingly engages the patch 118. The heating apparatus 700 additionally has a weep hole 740 to allow the drainage of any water which may accumulate on the upper surface of the heating element stem 760.

Preferably, the heating apparatus is capable of heating to a temperature of between about 50° F. and 400° F. The actual temperature and amount of time heat is applied is dependent on the type and amount of epoxy/bonding agent used and the ambient temperature at the time of installation of the patch 118. To provide this amount of heat energy, between about 4 and 20 amps of electrical current are necessary. Preferably the heat will allow the complete curing of the epoxy/bonding agent within about 10–25 minutes, although complete curing within about 10 minutes is more likely. Alternatively, ultraviolet light or radiation energy may be used to cure the interconnection substrate 608 in a time period of about 10–20 minutes.

In an alternative embodiment of the present invention, heat energy may be provided by a portable power source, such as portable batteries which may be interconnected to the support cage, or more likely to a portion of the robot mechanism 100. Further, the heat energy could be selectively provided by a timer device or by movement of the scissor multiplier 120 which is activated during application of the patch 118.

Figure 10:
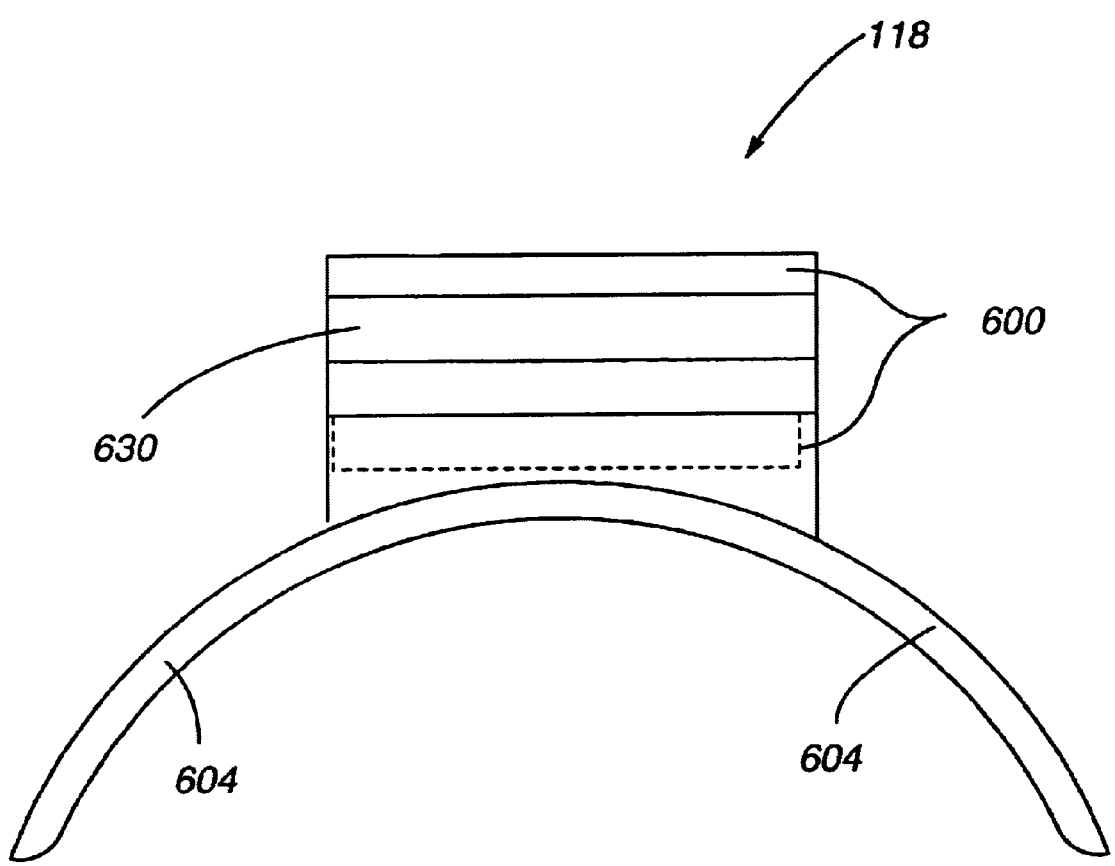
FIG. 10 is a side view of a patch having a seal.

In a preferred embodiment of the present invention the patch utilizes a sponge glue ring 609 which is positioned on top of the patch 118 and designed to be compressed between the patch 118 and the internal surface of the pipe. The heating element 700 positioned below the patch 118 is shown in FIG. 10, along with the sponge glue ring 609 which is wrapped around the patch stem 600 at the bonding surface 612. The sponge glue ring 607 is typically saturated with a water activated grout and sealed with a non-permeable cellophane on other similar material. Just prior to installation, the cellophane or other sealing membrane is cut or removed with a knife and a two-part epoxy or glue is applied to the sponge glue ring 609. The patch is then positioned below the designated pipe junction, put into position with the extension arm 112 and then heat energy is provided to the patch 118 and sponge glue ring 609 or other interconnection substrate 608 to quickly secure the patch 118 at the junction pipe junction. The robot 100 is then removed from the pipe.

Figure 6:
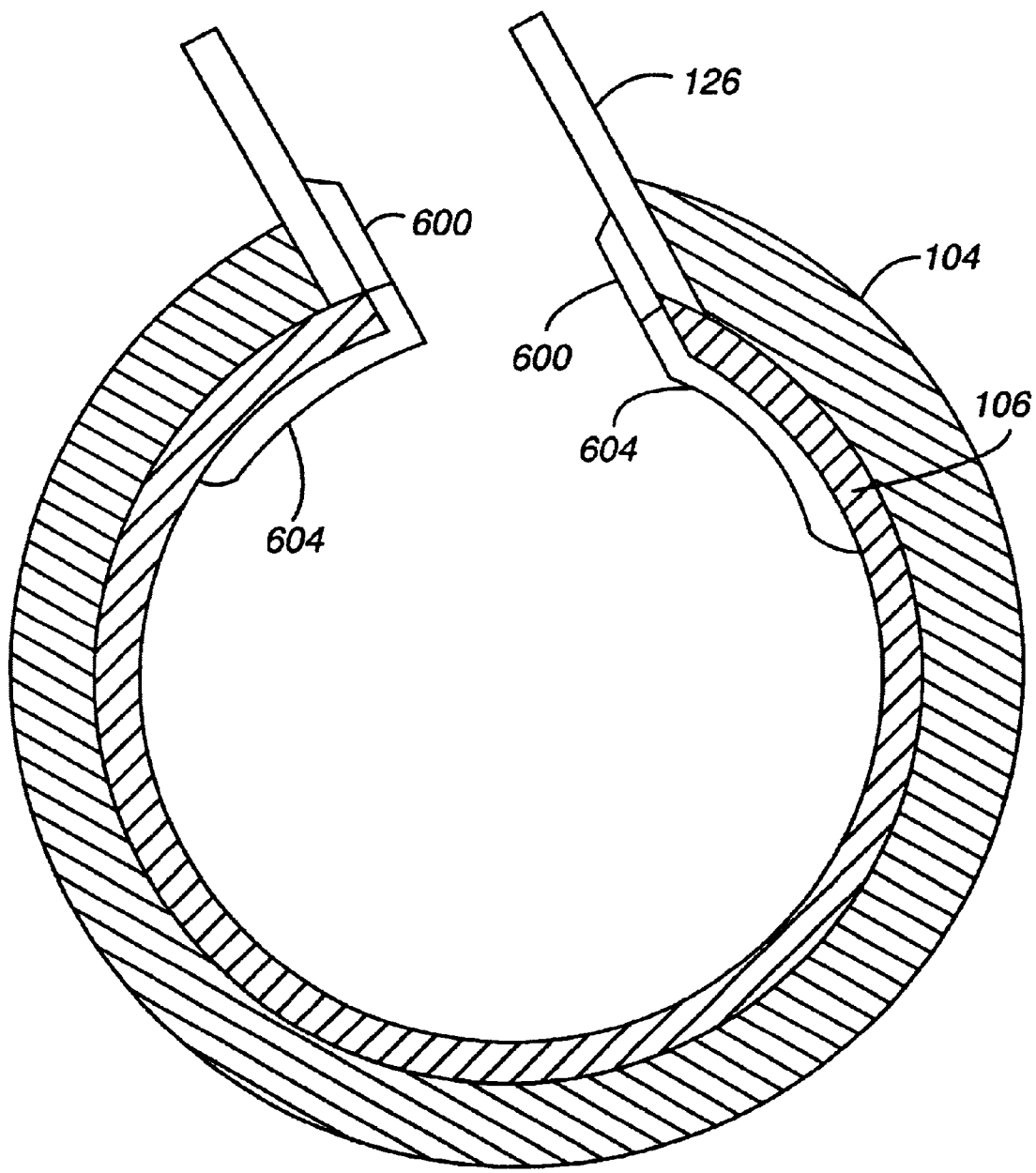
FIG. 6 is a side view of an angled juncture to a pipe to be repaired showing the flexible patch.
Figure 7:
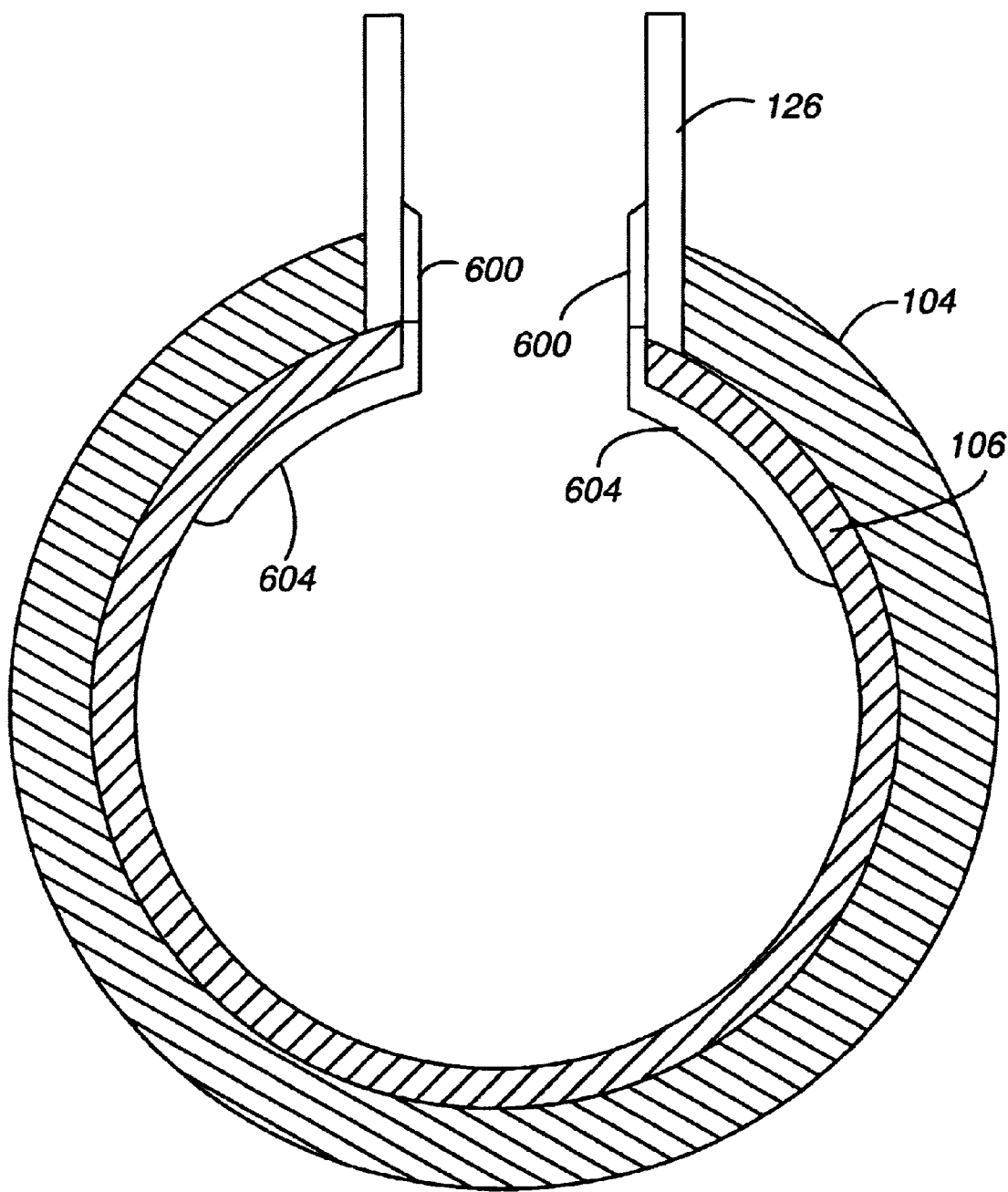
FIG. 7 is a side view of a right angle juncture to a pipe to be repaired showing the flexible patch.

With reference to FIG. 6, a side cutout view of the main pipeline 104 with a lateral service line 126 joining the main pipeline at an angle other than ninety degrees is shown. Many of these pipelines also have liners 106, which are typically used to maintain the integrity of the main pipeline. The convex flange 604 of the patch 118 is shown adhered to the liner 106. It should be obvious to one of skill in the art that, if the liner were not present, the convex flange can be adhered to the interior surface of the pipeline. FIG. 6 also show the tubular stem 600 of the patch angled such that the tubular stem fits within the lateral service line and matches the angle at which the lateral service line meets the main pipeline. One advantage of the flexible patch is that the flexible patch can also be used where the lateral service line meets the main pipeline at a ninety-degree angle, as shown in FIG. 7.

Figure 8:
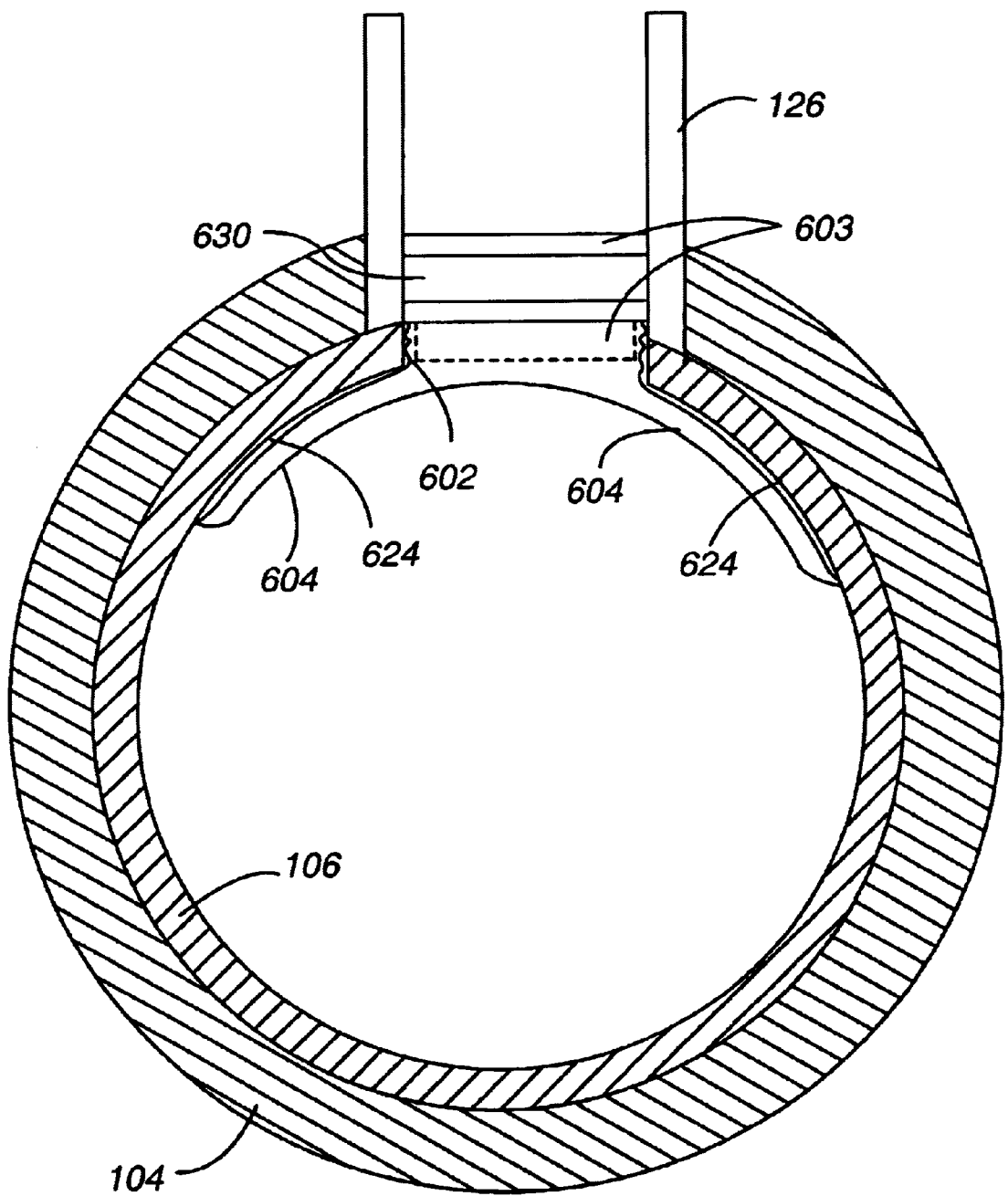
FIG. 8 is a side view of a right angle juncture to a pipe to be repaired with a flexible patch having a seal.
Figure 9:
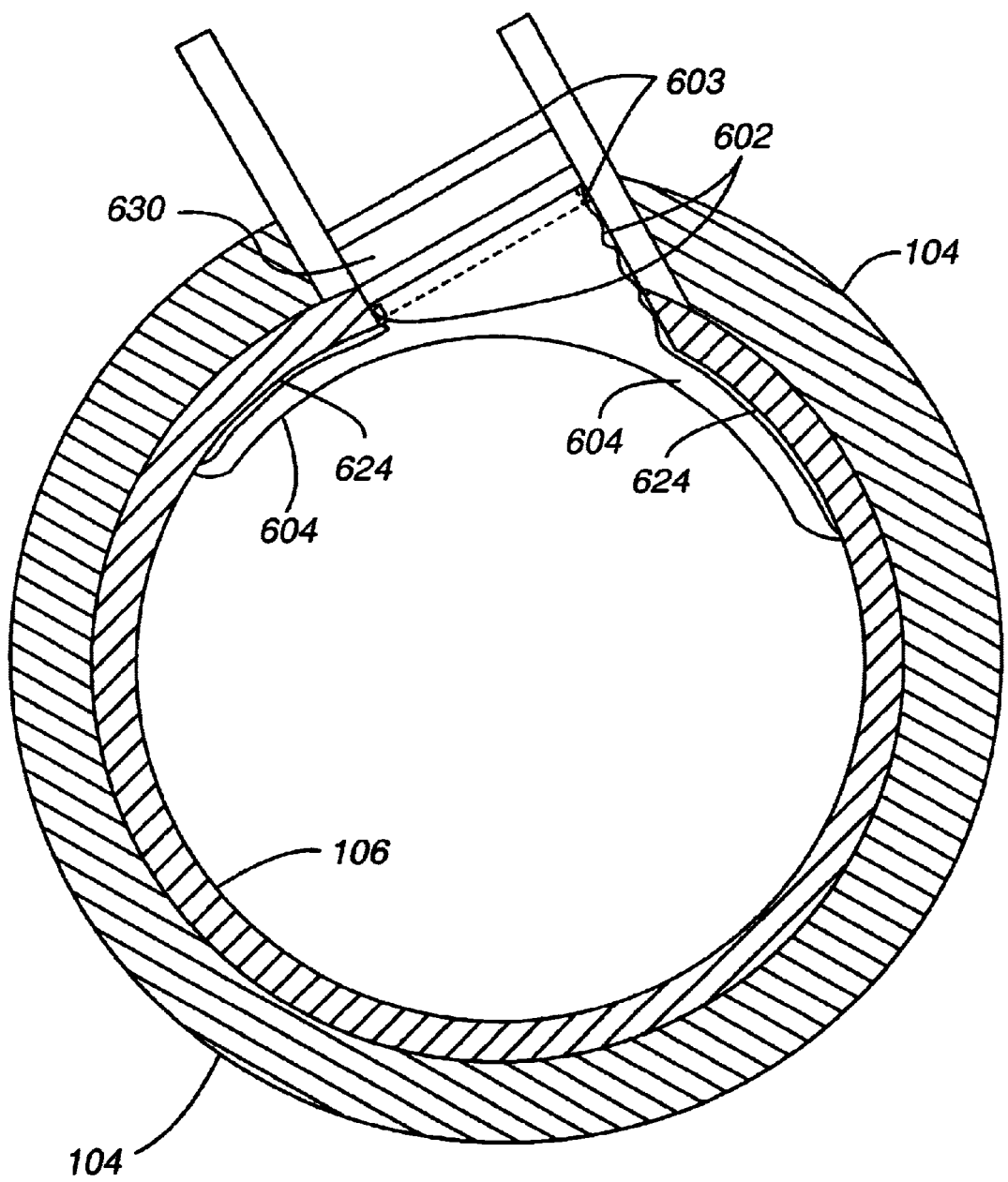
FIG. 9 is a side view of an angles juncture to a pipe to be repaired showing a flexible patch having a seal.

FIG. 8 also depicts a side cutout view of the main pipeline 104 with a lateral service line 126 joining the main pipeline at an angle of ninety degrees. The convex flange 604 of the patch 118 is shown adhered to the liner 106. Also shown in FIG. 9 is the use of epoxy or an adhesive material 624 to fixedly secure the patch to the main pipeline. Since the angle at which the lateral service line joins the main pipeline is substantially ninety degrees, the flexible portion 602 of the tubular stem 600 is shown in a non-deformed position. The rigid portion 603 of the tubular stem 600 extends through a fraction of the length of the flexible portion in order to provide continuity and a stable base for the seal 630. The seal 630 is mounted between the rigid portions 603 of the tubular stem 600. The seal, preferably, has hydrophilic properties in order to repel the water and water-based items that are usually processed through such service lines and main pipeline. The seal is used to seal off the lateral service line and, since the patch is removable, the patch and seal combination described herein can be used to either permanently seal the lateral service line in order to remove the line from service or temporarily seal the lateral service line in cases where work needs to be done on that line or for any other reason.

FIG. 9 also depicts a side cutout view of the main pipeline 104 with a lateral service line 126 joining the main pipeline at an angle other than ninety degrees. The convex flange 604 of the patch 118 is shown adhered to the liner 106. Also shown in FIG. 9 is the use of epoxy or an adhesive material 624 to fixedly secure the patch to the main pipeline. Since the angle at which the lateral service line joins the main pipeline is substantially ninety degrees, the flexible portion 602 of the tubular stem 600 is shown in a deformed position. The rigid portion 603 of the tubular stem 600 extends through a fraction of the length of the flexible portion in order to provide continuity and a stable base for the seal 630. The flexible portion can be created in any fashion. In one embodiment of the invention, the flexible portion is fashioned in an accordion style in order to allow for expansion and contraction, as shown in FIG. 9. It will be obvious to one of skill in the art that other styles that will allow for expansion and contraction are feasible for use as the flexible portion of the tubular stem. Both the rigid portion and the flexible portion of the tubular stem are made, preferably, from PVC, although any similar material will suffice. The seal 630 is mounted between the rigid portions 603 of the tubular stem 600. The seal is, preferably, made from materials which are hydrophilic and will be resistant to adverse environmental conditions such as pressure, temperature, and the presence of acidic or basic chemicals or contaminants. In addition, the seal can be made of materials which can be activated to expand into the space in which the seal is placed. Examples of such materials include but are not limited to expandable foam, PVC foam, urethane foam, and other similar materials. Thus, once the seal is in place inside the lateral service line, the seal can be activated, either by heat, concussion, or chemical reaction. The activated seal will then expand within the confines of the lateral service line to ensure that no material can slip between any spaces located between the tubular stem and the lateral service line.

FIG. 10 shows a side view of the patch 118, without a flexible portion, according to the present invention with a seal 630. The seal 630 is shown as being approximately the same diameter of the tubular stem 600. However, one of skill in the art will recognize that the seal can also be placed at various levels with respect to the tubular stem in order to accomplish the function of the seal.

FIG. 11 shows a side view of the patch 118 shown in FIG. 10 having an activated seal 630. As is shown in FIG. 11, when the seal, in one embodiment of the present invention, is activated, the seal 630 will expand to fill in any space that may be present between the rigid portions 603 of the tubular stem 600 and the lateral service line 126.

Figure 12:
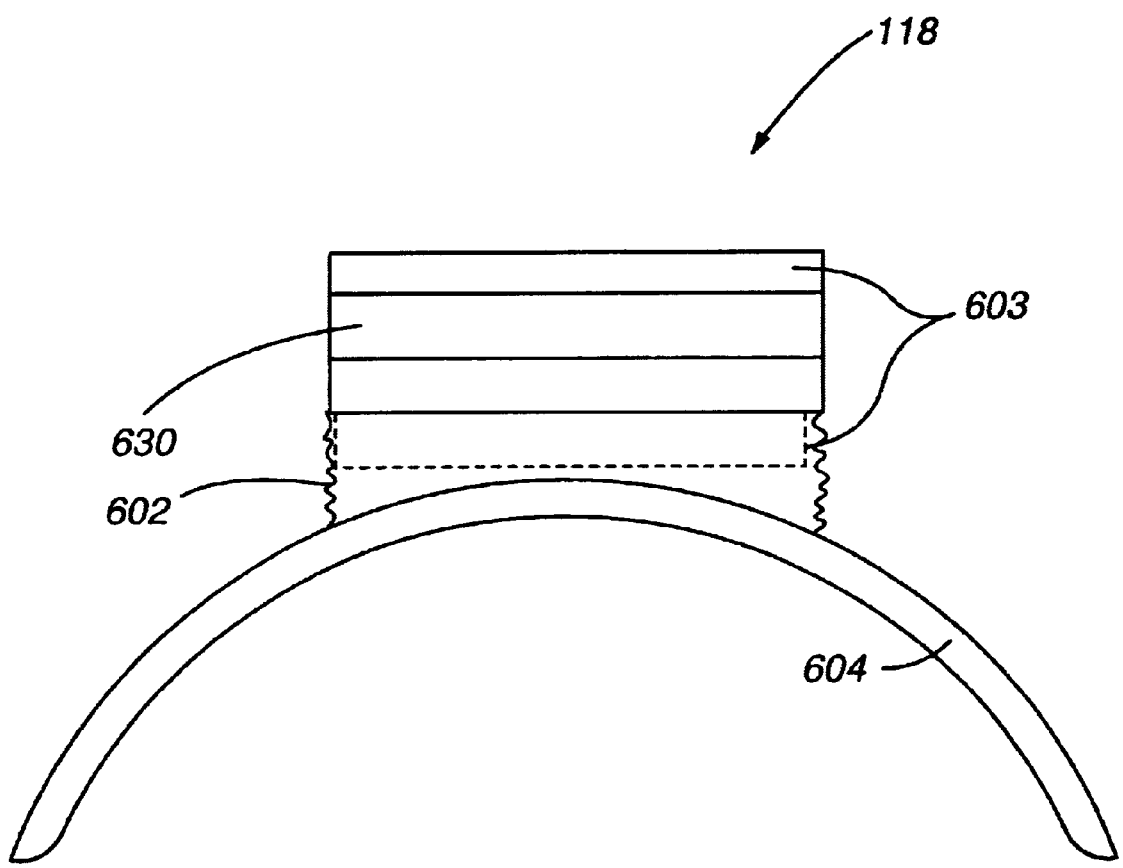
FIG. 12 is a side view of a flexible patch having a seal.

FIG. 12 shows a side view of the patch 118 according tot he present invention with a seal 630 and a tubular stem 600 having a flexible portion 602 and at least one rigid portion 603. The seal 630 is shown as being approximately the same diameter of the tubular stem 600. However, one of skill in the art will recognize that the seal can also be placed at various levels with respect to the tubular stem in order to accomplish the function of the seal. One of skill in the art will also recognize that, where a flexible patch is desired, the seal may not be as effective if placed within the length of the flexible portion of the tubular stem.

Figure 13:
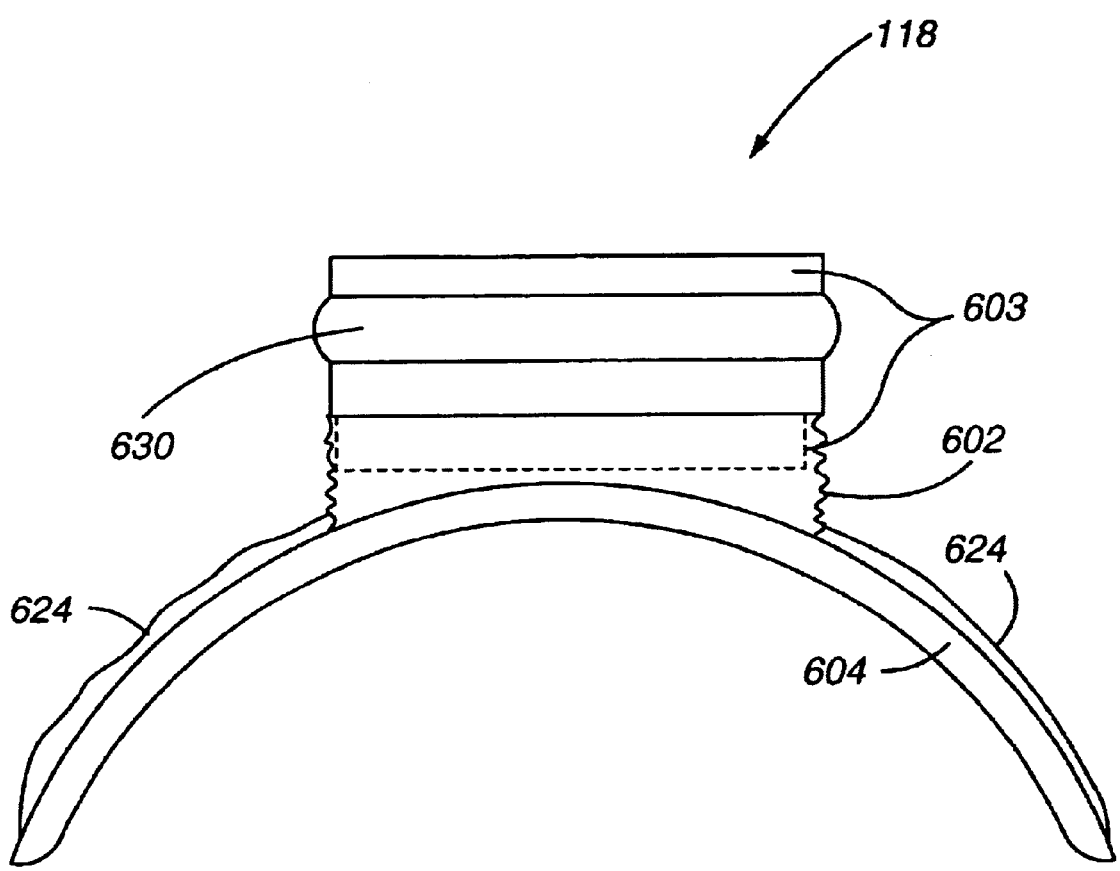
FIG. 13 is a side view of a flexible patch having an activated seal and showing the use of epoxy to adhere the patch to a juncture.

FIG. 13 shows a side view of the patch 118 shown in FIG. 12 having an activated seal 630. As is shown in FIG. 13, when the seal, in one embodiment of the present invention, is activated, the seal 630 will expand to fill in any space that may be present between the rigid portions 603 of the tubular stem 600 and the lateral service line 126.

For the ease of the reader in referring to the drawings, the following component list is provided:

| | |
|---|---|
| Robot | 100 |
| Main pipeline | 104 |
| Lining | 106 |
| Junction | 122 |
| Lateral Service Pipe | 126 |
| Upper Platform | 108 |
| Forward end | 130 |
| Slots | 128, 142 |
| Extension Arm | 112 |
| Support Cage | 116 |
| Cylindrical Stem | 300 |
| Cross Member | 304 |
| Oval Support | 308 |
| Top Talon | 312 |
| Bottom Talon | 316 |
| First Talon | 320 |
| Second Talon | 324 |
| Integral Heating Element | 700 |
| Apertures | 720 |
| Weep Hole | 740 |
| Heating Element Stem | 760 |
| Inverted Tee Patch | 118 |
| Tubular stem | 600 |
| Flex Portion | 602 |
| Rigid Portion | 603 |
| Convex Flange | 604 |
| Interconnection Substrate | 608 |
| Sponge Glue Ring | 609 |
| Bonding Surface | 612 |
| Beveled Edge of Stem | 616 |
| Circular Cutout | 620 |

-continued

| | |
|---|---|
| Epoxy | 624 |
| Sleeve or Bushing | 690 |
| Seal | 630 |
| Scissor Multipliers | 120 |
| Pins | 146 |
| Lower Platform | 124 |
| Forward End | 134 |
| Rear end | 138 |

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing best mode of carrying out the invention should be considered exemplary in nature and not as limiting to the scope and spirit of the invention as set forth in the appended claims.

What is claimed is:

1. A patch adapted for insertion into a main pipeline to sealingly repair a junction between the main pipeline and a lateral service line, comprising:

a tubular stem having a substantially rigid portion, a flexible portion, a first end and a second end, the second end having a substantially open aperture for communication with the lateral service line;

a convex flange having an exterior surface, an interior surface and a cutout portion operatively sized and interconnected to the first end of said tubular stem, wherein said tubular stem extends away from the exterior surface of said convex flange;

said flexible portion of said tubular stem having deformation properties adapted to allow the rigid portion of the tubular stem to be selectively engaged into said lateral service line at the angle at which the lateral service line is joined to the main pipeline; and, sealing means interconnected to at least a portion of the exterior surface of said convex flange and having resilient deformation properties adapted to provide sealing engagement between said convex flange and an interior surface of the main pipeline.

2. The patch of claim 1, wherein said convex flange is substantially rigid.

3. The patch of claim 1, wherein the exterior surface of the convex flange is contoured to have a shape substantially coextensive with the interior surface of the main pipeline.

4. The patch of claim 1, wherein the flexible portion of the tubular stem is bendable.

5. The patch of claim 1, wherein said sealing means substantially surrounds at least the point of interconnection between said convex flange and said tubular stem.

6. The patch of claim 1, wherein said sealing means is comprised of at least one of a foam rubber, a felt, a rubber, a synthetic polymer, a sponge, or a cloth.

7. The patch of claim 1, wherein said patch further comprises an adhesive means interconnected to or impregnated within the sealing means.

8. The patch of claim 1, wherein said sealing means comprises a permeable substrate material impregnated with an adhesive material.

9. The patch of claim 1, further comprising a seal operably interconnected to said tubular stem which is adapted to fit within the lateral service line to sealingly engage the lateral service line to said tubular stem.

10. A method for remotely installing a patch to an underground junction between a main pipeline and a lateral service line, wherein said lateral service line is joined to the main pipeline at an angle other than a ninety-degree angle, comprising the steps of:

(a) providing a patch comprising:
  a tubular stem having a substantially rigid portion, a flexible portion, a first end and a second end, the second end having a substantially open aperture for communication with the lateral service line;
  a convex flange having an exterior service, an interior surface and a cutout portion operatively sized and sealingly interconnected to the first end of said tubular stem, wherein said tubular stem extends away from the exterior surface of said convex flange;
  said flexible portion having deformation properties adapted to allow the rigid portion of the tubular stem to be fit into said lateral service line at the angle at which the lateral service line is joined to the main pipeline; and,
  sealing means interconnected to the exterior surface of said convex flange having resilient deformation properties adapted to provide sealing engagement between said convex flange and an interior surface of the main pipeline;
(b) determining a location of the junction between the main pipeline and the lateral service line;
(c) removably attaching said patch to a support cage;
(d) positioning said support cage adjacent to the location of the underground junction;
(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;
(f) curing said patch so that said patch becomes fixedly connected to the internal surface of the main pipeline wherein said patch substantially prevents infiltration of foreign matter into the main pipeline at the underground junction;
(g) deactivating the lateral extender to move said support cage from the second engagement position to the first traveling position; and
(h) removing said lateral extender and said support cage from the main pipeline.

11. The method for installing a patch of claim 10, wherein said patch further comprises an adhesive means interconnected to or impregnated within said sealing means for interconnecting said means to the interior surface of the main pipeline.

12. The method for installing a patch of claim 10, wherein the step of activating a lateral extender includes deforming the flexible portion of the tubular stem of the patch such that the flexible portion of the tubular stem is substantially coextensive with an interior surface of the lateral service line at the angle which the lateral service line joins the main pipeline.

13. A patch adapted for removable interconnection for insertion into a main pipeline to sealingly repair a junction between a main pipeline and a lateral service line wherein said lateral service line is joined to the main pipeline at an angle other than a ninety-degree angle, comprising:

a tubular stem having a substantially rigid portion, a first end and a second end;
  a convex flange having an exterior service, an interior surface and a cutout portion in operable communication with said first end of said tubular stem;
  a flexible portion hingedly interconnecting said first end of said tubular stem and said convex flange which is adapted to allow the rigid portion of the tubular stem to be fit into said lateral service line at the angle at which the lateral service line is joined to the main pipeline;
  a seal operably interconnected to an extension surface of said tubular stem and adapted to engage with the lateral service line; and
  a sealing substrate interconnected to the exterior surface of said convex flange which has resilient deformation properties adapted to provide sealing engagement between said convex flange and an interior surface of the main pipeline.

14. The patch of claim 13, wherein said convex flange is substantially rigid.

15. The patch of claim 13, wherein the exterior surface of the convex flange is contoured to have a shape substantially coextensive with the interior surface of the main pipeline.

16. The patch of claim 13, wherein the flexible portion of the tubular stem is a bendable accordion type plastic material.

17. The patch of claim 13, wherein said sealing substrate substantially surrounds the point of interconnection of said convex flange and aid tubular stem.

18. The patch of claim 13, wherein said sealing substrate is comprised of at least one of a foam rubber, a felt, a rubber, a synthetic polymer, a sponge and a cloth.

19. The patch of claim 13, wherein said patch further comprises an adhesive interconnected to or impregnated within the sealing substrate.

20. The patch of claim 13, wherein said sealing substrate comprises a permeable material impregnated with an adhesive material.

21. The patch of claim 13, wherein said convex flange covers a portion of a circumference of the main pipeline at least 1.5 times a diameter of the lateral service line.

22. The patch of claim 13, wherein said tubular stem has a first length less than a length of the lateral service line.

23. The patch of claim 13, wherein said tubular stem has a first length less than half of a length of the lateral service line.

24. The patch of claim 13, wherein said tubular stem has a first length less than a diameter of the main pipeline.

25. The patch of claim 13, wherein said flexible portion of the tubular stem is bendable to allow said tubular stem to switch in a complete 360 degree circle with respect to said flange.

26. A method for remotely installing a patch to an underground junction between a main pipeline and a lateral service line, wherein said lateral service line is joined to the main pipeline at an angle other than a ninety-degree angle, comprising the steps of:

(a) providing a patch comprising:
  a tubular stem having a substantially rigid portion, a flexible portion, a first end and a second end, the second end having a substantially open aperture for communication with the lateral service line;
  a convex flange having an exterior service, an interior surface and a cutout portion operatively sized and interconnected to the first end of said tubular stem, wherein said tubular stem extends away from the exterior surface of said convex flange;

said flexible portion having deformation properties adapted to allow the rigid portion of the tubular stem to be fit into said lateral service line at the angle at which the lateral service line is joined to the main pipeline;

a seal, said seal adapted to expand to fit within the lateral service line to seal off the lateral service line; and, sealing means interconnected to the exterior surface of said convex flange having resilient deformation properties adapted to provide sealing engagement between said convex flange and an interior surface of the main pipeline;

(b) determining a location of the junction between the main pipeline and the lateral service line;

(c) removably attaching said patch to a support cage;

(d) positioning said support cage adjacent to the location of the underground junction;

(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;

(f) curing said patch so that said patch becomes fixedly connected to the internal surface of the main pipeline wherein said patch substantially prevents infiltration of foreign matter into the main pipeline at the underground junction;

(g) deactivating the lateral extender to move said support cage from the second engagement position to the first traveling position; and (h) removing said lateral extender and said support cage from the main pipeline.

27. The method for installing a patch of claim 26, wherein said patch further comprises an adhesive means interconnected to or impregnated within said sealing means for interconnecting said means to the interior surface of the main pipeline.

28. The method for installing a patch of claim 26, wherein the step of activating a lateral extender includes deforming the flexible portion of the tubular stem of the patch such that the flexible portion of the tubular stem is substantially coextensive with an interior surface of the lateral service line at the angle which the lateral service line joins the main pipeline.

29. A method for remotely installing a patch to an underground junction between a main pipeline and a lateral service line, wherein said lateral service line is joined to the main pipeline at an angle other than a ninety-degree angle, comprising the steps of:

(a) providing a patch comprising:

a substantially rigid tubular stem having a first end and a second end, the second end;

a convex flange having an exterior service, an interior surface and a cutout portion in operable communication with said substantially rigid tubular stem, wherein said convex flange is hingedly interconnected to the first end of said tubular stem;

a seal, said seal adapted to fit within the lateral service line to seal off the lateral service line; and, sealing substrate interconnected to the exterior surface of said convex flange having resilient deformation properties adapted to provide sealing engagement between said convex flange and an interior surface of the main pipeline;

(b) determining a location of the junction between the main pipeline and the lateral service line;

(c) removably attaching said patch to a support cage;

(d) positioning said support cage adjacent to the location of the underground junction;

(e) activating a lateral extender to move said support cage from a first traveling position to a second engagement position so that said patch is positioned with said tubular stem within the lateral service line and said sealing substrate is positioned against an internal surface of the main pipeline proximate to said lateral service line;

(f) curing said patch so that said patch becomes fixedly connected to the internal surface of the main pipeline wherein said patch substantially prevents infiltration of foreign matter into the main pipeline at the underground junction;

(g) deactivating the lateral extender to move said support cage from the second engagement position to the first traveling position; and (h) removing said lateral extender and said support cage from the main pipeline.

30. The method for installing a patch of claim 29, wherein said patch further comprises an adhesive means interconnected to or impregnated within said sealing means for interconnecting said means to the interior surface of the main pipeline.

31. The method for installing a patch of claim 29, wherein the step of activating a lateral extender includes deforming the flexible portion of the tubular stem of the patch such that the flexible portion of the tubular stem is substantially coextensive with an interior surface of the lateral service line at the angle which the lateral service line joins the main pipeline.

\* \* \* \* \*